(12) United States Patent
Offerhaus et al.

(10) Patent No.: US 6,437,287 B1
(45) Date of Patent: Aug. 20, 2002

(54) LASER PROCESSING DEVICE

(75) Inventors: Herman Leonard Offerhaus; Richard Antonius Kleijhorst; Peter Johannes Maria van der Slot, all of Enschede (NL)

(73) Assignee: Nederlandse Centrum Voor Laser Research B.V. (NL)

( * ) Notice: Subject to any disclaimer, the term of this patent is extended or adjusted under 35 U.S.C. 154(b) by 0 days.

(21) Appl. No.: 09/486,912
(22) PCT Filed: Sep. 18, 1998
(86) PCT No.: PCT/NL98/00543
§ 371 (c)(1),
(2), (4) Date: May 5, 2000
(87) PCT Pub. No.: WO99/14009
PCT Pub. Date: Mar. 25, 1999

(30) Foreign Application Priority Data

Sep. 18, 1997 (NL) .............................................. 1007068

(51) Int. Cl.[7] .............................................. B23K 26/02
(52) U.S. Cl. .............................. 219/121.83; 219/121.85; 219/121.6; 219/121.61; 219/121.62
(58) Field of Search .................... 219/121.83, 121.85, 219/121.6, 121.61, 121.62

(56) References Cited

U.S. PATENT DOCUMENTS

| | | | | |
|---|---|---|---|---|
| 4,573,467 A | * | 3/1986 | Rich et al. | 128/303.1 |
| 4,611,115 A | * | 9/1986 | Rich | 250/216 |
| 4,769,523 A | * | 9/1988 | Tanimoto et al. | 219/121.6 |
| 5,382,770 A | * | 1/1995 | Black et al. | 219/121.63 |
| 5,609,780 A | * | 3/1997 | Freedenberg et al. | 219/121.73 |
| 5,698,120 A | * | 12/1997 | Kurosawa et al. | 219/121.62 |
| 6,040,550 A | * | 3/2000 | Chang | 219/121.63 |

\* cited by examiner

*Primary Examiner*—M. Alexandra Elve
(74) *Attorney, Agent, or Firm*—Michaelson & Wallace; Peter L. Michaelson

(57) ABSTRACT

There is described a laser processing device (1) whereby, by means of laser light (6), a workpiece (4) can be processed and wherein, at the same time, an image of the workpiece (4) to be processed is obtained, wherein the focusing of the imaging optics is independent of the focusing of the laser optics. The device (1) comprises a stationary laser mirror (21) and laser focusing optics (22), which laser focusing optics (22) are axially displaceable relative to the laser mirror (21). The device (1) further comprises imaging optics (23) which are al axially displaceable relative to the laser mirror (21), such that the axial distance between the laser focusing optics (22) and the imaging optics (23) is constant.

18 Claims, 4 Drawing Sheets

LASER PROCESSING DEVICE

BACKGROUND OF THE INVENTION

1. Field of the Invention

The invention relates to a processing/observation head for a laser processing device, comprising:

means for focusing a light beam on a focus spot via a first optical path;

means for forming a sharp image of a workpiece to be processed via a second optical path which at least partly coincides with the first optical path, the imaging means comprising laser focusing optics and imaging optics whose optical axes coincide with said second optical path, the focusing means comprising said laser focusing optics and a laser mirror disposed between the laser focusing optics and the imaging optics, which laser mirror makes an angle with the second optical path and at least partly reflects laser light and at least partly transmits visible light.

The invention also relates to a laser processing device comprising such processing/observation head.

Hereinafter, the present invention will be specifically explained for cutting a workpiece, which in the example to be discussed is aluminum foil. However, it will be understood by anyone skilled in the art that with a laser beam other operations can be performed as well, and that other materials can be processed.

2. Description of the Prior Art

Processing a workpiece does not only involve the necessity of providing a suitable tool, in this case a laser beam and associated focusing optics. It is also desired that the operating process can be optically followed. In this respect, it is of course desired that optics are present which provide a sharp image of the processing spot, i.e. the momentary interaction area between laser beam and workpiece. For practical reasons, the focusing optics and the imaging optics should have parts in common. On the other hand, it is desired that the focus of the laser beam can be set without this affecting the focusing of the observation optics.

A processing/observation head of the type mentioned in the opening paragraph is known from U.S. Pat. No. 4,573,467.

In the known processing/observation head, the first and the second optical path only coincide in the focus spot and are further entirely separated from each other. As a result, the laser focusing optics must have relatively large dimensions. Further, the entire head must be moved relative to an object to be processed for obtaining a distance to the workpiece to be processed at which the image is sharp and the light beam is focused on the focus spot.

SUMMARY OF THE INVENTION

The present invention provides a laser processing device which meets the above desires and drawbacks and is characterized in that the laser mirror at least partly reflects laser light and at least partly transmits visible light and that the laser focusing optics are displaceable with respect to the laser mirror along the first optical path, and that the imaging optics are displaceable with respect to the laser mirror along the second optical path, such that the mutual distance between the laser focusing optics and the imaging optics, measured along the second optical path, is constant.

The invention also relates to a laser processing device comprising a frame, a manipulator mounted on the frame, such as an XY-table for manipulating a workpiece to be processed, a processing/observation head mounted on the frame above the manipulator.

The invention also relates to a laser processing device comprising a processing/observation head, setting means for displacing, with the supply of control signals and in a direction along said optical axes, the laser focusing optics, the imaging optics, and a support on which, in use, a camera can be mounted and an autofocusing system arranged for generating such control signals which, in use, are supplied to the setting means, that the image formed is sharp.

BRIEF DESCRIPTION OF THE DRAWINGS

The invention will be further explained with reference to the accompanying drawings. In these drawings.

DETAILED DESCRIPTION OF A PREFERRED EMBODIMENT

Figure 1:
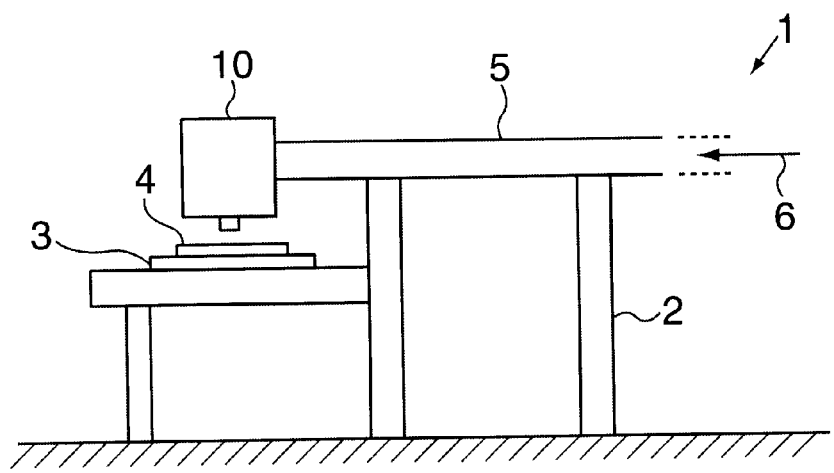
FIG. 1 is a schematic side elevation of a first embodiment of a set-up of a laser processing device according to the present invention.

In the Figures, a laser processing device according to the present invention is generally designated by reference numeral 1. The device 1 comprises a frame 2 mounting an XY-displacement table 3 on which a workpiece 4 to be processed can be positioned. The device 1 further comprises a processing/observation head 10 mounted on the frame 2, above the XY-displacement table 3.

Figure 2:
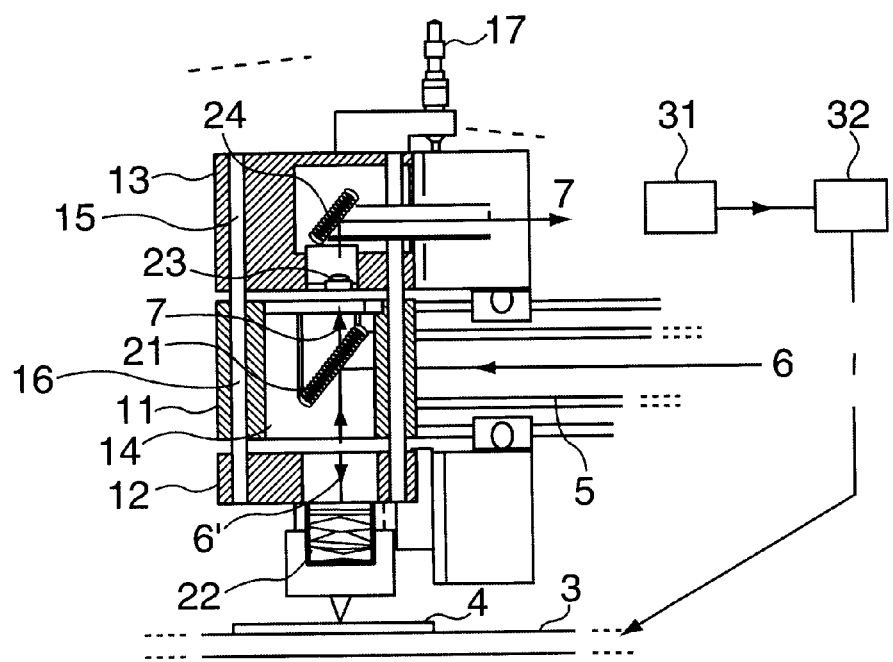
FIG. 2 shows to a larger scale some details of the laser processing device of FIG. 1.

In FIG. 1, the processing/observation head 10 is only schematically indicated as a whole. FIG. 2 shows more details of the processing/observation head 10, which will hereinbelow simply be referred to as head 10.

For generating a laser beam 6, the device 1 comprises a laser which is not shown in the Figures for simplicity's sake. In principle, any suitable laser source can be used for this. In a test arrangement, a diode-pumped Nd:YAG laser was used which, operating in a $TEM_{00}$ transversal mode, was able to provide laser pulses having energy contents of 5 mJ per pulse. The laser could selectively be operated with free-running pulses of 200 $\mu$s or with Q-switched pulses of 10 ns at a repetition frequency of 1 kHz. The wavelength of the generated laser light 6 was 1064 nm. For more information regarding the laser source used, reference is made to the article "Diode pumped 1 kHz high power Nd:YAG laser with excellent quality" by H. P. Godfried and H. L. Offerhaus in XI International Symposium on Gas Flow and Chemical Lasers and High Power Laser Conference, Proc. SPIE 3092, 1996, pp. 29–32, editor H. J. Baker.

The laser light 6 can be supplied to the head 10 in any suitable manner. In the test arrangement mentioned, the light 6 was led through a horizontally directed tube 5 of the type X-95 macro bench profile, which formed part of the frame 2. The beam provided by the laser source had a diameter of 0.5 mm, but for the transmission to the head 10, it was expanded in the tube 5 to a diameter of 50 mm by means of a telescope arranged in the tube 5, which telescope is not shown for simplicity's sake, either.

The head 10 comprises a first head housing 11 which is fixedly mounted on said tube 5 and has an opening (not shown) communicating with the interior of the tube 5 through which the laser light 6 can reach the internal space 14 in the first head housing 11. Arranged within that internal space 14 is a laser mirror 21 which is fixedly (but settably) attached to the first head housing 11, so that that laser mirror 21 is fixed relative to the incoming laser light 6. The laser mirror 21 is reflective of the wavelength of the laser light 6 and is positioned at an angle of 45° for reflecting the horizontally incoming laser light into a vertically downward direction.

The head 10 further comprises a second head housing 12 located under the first head housing 11. Arranged in the second head housing 12 are laser focusing optics 22, fixedly attached to the second head housing 12. The laser focusing optics 22 are positioned for receiving the laser light 6' reflected downwards by the laser mirror 21, and are arranged for focusing that parallel laser light 6' to a spot whose diameter, at said beam diameter of 50 mm, was about 2 $\mu$m and whose focus depth was about 0.8 $\mu$m. In the test arrangement, the laser focusing optics 22 were constructed as a triplet, but it will be understood by anyone skilled in the art that the laser focusing optics 22 can have any suitable configuration.

In order to focus the laser light 6' on the workpiece 4, the laser focusing optics 22 are displaceable along the optical axis of the laser light 6', i.e. vertically. To that end, the second head housing 12 is vertically displaceable relative to the first head housing 11, as will be described in more detail hereinbelow.

For observing the workpiece 4, at least the surroundings of the focus spot on the workpiece 4, visible light 7 is used, collected from the workpiece 4 by the laser focusing optics 22. The laser mirror 21 transmits visible light, at least light whose wavelength sufficiently differs from the laser light 6. Thus, the visible light beam 7 is transmitted by the laser mirror 21. Disposed above the laser mirror 21 are imaging optics 23, which in one embodiment can be formed by a single lens. The imaging optics 23 focus the visible light 7 at a predetermined imaging point, not shown in the Figures for simplicity's sake. At this imaging point, an observer can visually observe the image of the workpiece. It is also possible that at the imaging point a CCD camera 31 is disposed, providing a signal representative of the image of the workpiece to an image-processing control member 32 which can actuate the XY-table 3 for making a cut of a predetermined shape in the workpiece 4.

According to an important aspect of the present invention, the image of the workpiece 4 formed at the imaging point remains sharp and of constant size, regardless of the focusing position of the laser focusing optics 22. To that end, the focal distance of the imaging optics 23 is equal to that of the laser focusing optics 22, and the optical path length between the laser focusing optics 22 and the imaging optics 23 is equal to the sum of said focal distances. Further, the imaging optics 23 are displaceable along the optical path of the observation light 7, the position of the imaging optics 23 being coupled to the position of the laser focusing optics 22, such that the optical path length between the laser focusing optics 22 and the imaging optics 23 remains constant. Hence, the combination of the laser focusing optics 22 and the imaging optics 23 forms an imaging telescope, with the optical distance between the workpiece 4 and the imaging point being constant.

It is observed that the spatial position of the laser focus point is coupled to the laser focusing optics 22, and hence moves along therewith during displacement of the laser focusing optics 22, but that the spatial position of the image of the workpiece 4 formed by the imaging telescope 22, 23 is fixed and independent of the position of the imaging telescope. During operation, the set-up is first adjusted to the workpiece 4 to be processed, by positioning the camera at the imaging point; after that, the camera can be fixed at that position. Displacement of the laser focusing point 22 does not affect the focusing of the image of the workpiece, because during displacement of the laser focusing optics 22, the imaging optics 23 are displaced to an equal extent.

In the preferred embodiment shown, the above effect is achieved in that the head 10 has a third head housing 13 disposed above the first head housing 11. The imaging optics 23 are fixedly mounted in the third head housing 13. The second head housing 12 and the third head housing 13 are attached to each other by means of vertically directed bars 15, which in the example shown extend through vertical bores in the first head housing 11. However, it will be understood that the second head housing 12 and the third head housing 13 can be attached to each other in other suitable manners. In this connection, it is important that the combination of the second head housing 12 and the third head housing 13 is vertically displaceable relative to the first head housing 11 and hence relative to the frame 2. In the example shown, the second head housing 12 and the third head housing 13 are coupled to the frame 2 by means of slide bearings 16. For accurately setting the vertical position of the combination of the second head housing 12 and the third head housing 13, the third head housing 13 mounts the housing of a micrometer 17 whereby a setting accuracy of 0.5 $\mu$m can be realized. As is clearly shown in FIG. 2, the micrometer 17 has its axis vertically disposed, and the free end of the feeler pin of the micrometer 17 rests on the frame 2. However, it will be understood that other constructions for setting the vertical position of the combination of the second head housing 12 and the third head housing 13 are possible as well.

FIG. 2 shows that the optical path between the laser mirror 21 and the imaging point can be folded in that a second mirror 24 is incorporated into that optical path, which second mirror 24 in the example shown is positioned at an angle of 45° and is reflective of the light 7 so as to limit the total height of the set-up.

Preferably, the image of the workpiece is shown enlarged on said camera; in the experimental example, that enlargement was about 165 times. It will be understood that for such enlargement, conventional optical means may be used. Further, between CCD camera and monitor, a further enlargement factor is obtained; in the experimental example, that enlargement was about 20 times, as a result of which a total enlargement of about 3300 times was realized.

During use, the laser light 6' will create on the workpiece 4 a plasma which emits brightly visible light in the direction of the second lens 23. In this manner, this light can reach the CCD camera, which can be blinded thereby. To prevent such blinding, the camera is preferably synchronized relative to the laser system such that the camera can only register images between two successive laser pulses.

The device as described hereinabove can further be extended with an autofocusing system. This is in particular important when the workpiece to be processes is not flat. In other words, the workpiece can in that case comprise substantial height variations, as a result of which continuous focusing is desired.

Figure 3:
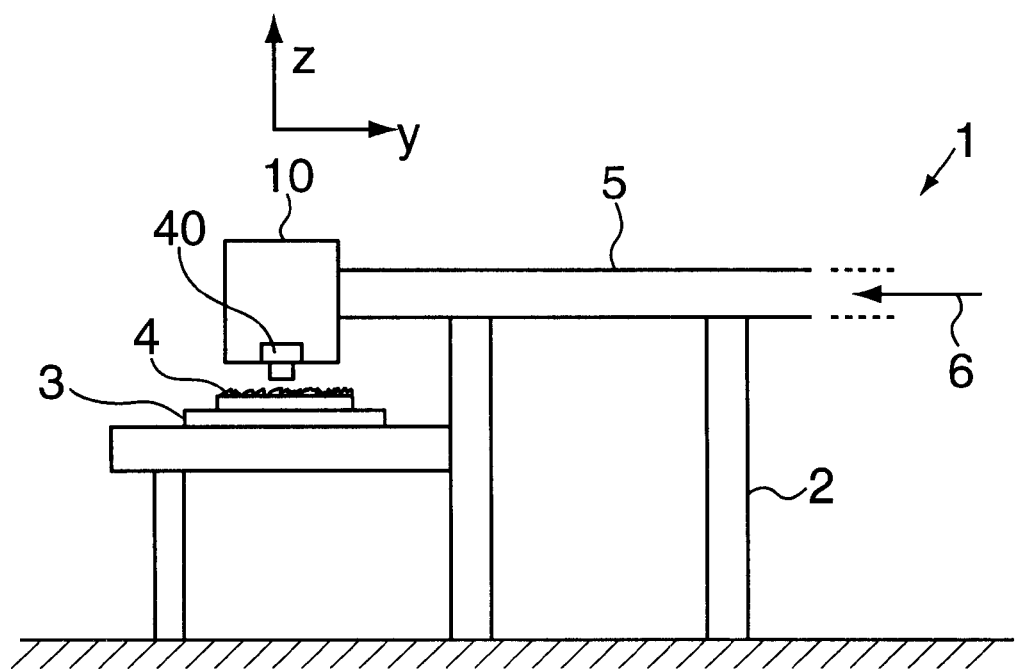
FIG. 3 is a schematic side elevation of a second embodiment of a set-up of a laser processing device according to the present invention.

FIG. 3 shows a possible embodiment of a laser processing device comprising the above-described processing/ observation head, and an autofocusing system. In FIG. 3, parts corresponding to parts of FIGS. 1 and 2 are provided with identical reference numerals. Like the device according to FIG. 2, the device according to FIG. 3 comprises a manipulator 3, in this case in the form of an XYZ-table 3. The XYZ-table 3 can move the object 4 positioned on top of the XYZ-table 3 relative to the head 10 in the directions XYZ as shown in FIG. 3, the X-direction being perpendicular to the plane of the drawing. The device further comprises an autofocusing system 40 which is known per se and which is in this example fixedly mounted on the first head housing 11. The autofocusing system 40 generates signals representative of the distance between the head 10 and the position of the object where the laser light 6 is to be focused. These signals are supplied to the XYZ-table 3 in a manner known per se, for continuously setting the height of the XYZ-table in the Z-direction. The operation of the device is as follows. The autofocusing system 40 first controls the XYZ-table 3 such that the image of the position to be processed of the object 4, which image is obtained by means of the processing/observation head 10, is at least substantially sharp. Next, the sharpness of the image and, accordingly, the focus spot is fine-adjusted once, through the above-discussed displacement of the second head housing 12 relative to the first head housing 11. The device is now synchronized. When the XYZ-table subsequently performs a movement of the object 4 in the XY-plane, the autofocusing system will detect the changes in the distance between the first head housing 11 and the focusing spot and, accordingly, the change between the second head housing 12 or processing/observation head 10 and the focusing spot, and supply control signals to the XYZ-table such that this change is compensated by a movement of the XYZ-table in the Z-direction. Thus, the focus spot and the image remain sharp. The autofocusing system 40 may comprise an autofocusing system known per se and will therefore not be further explained here.

Figure 4:
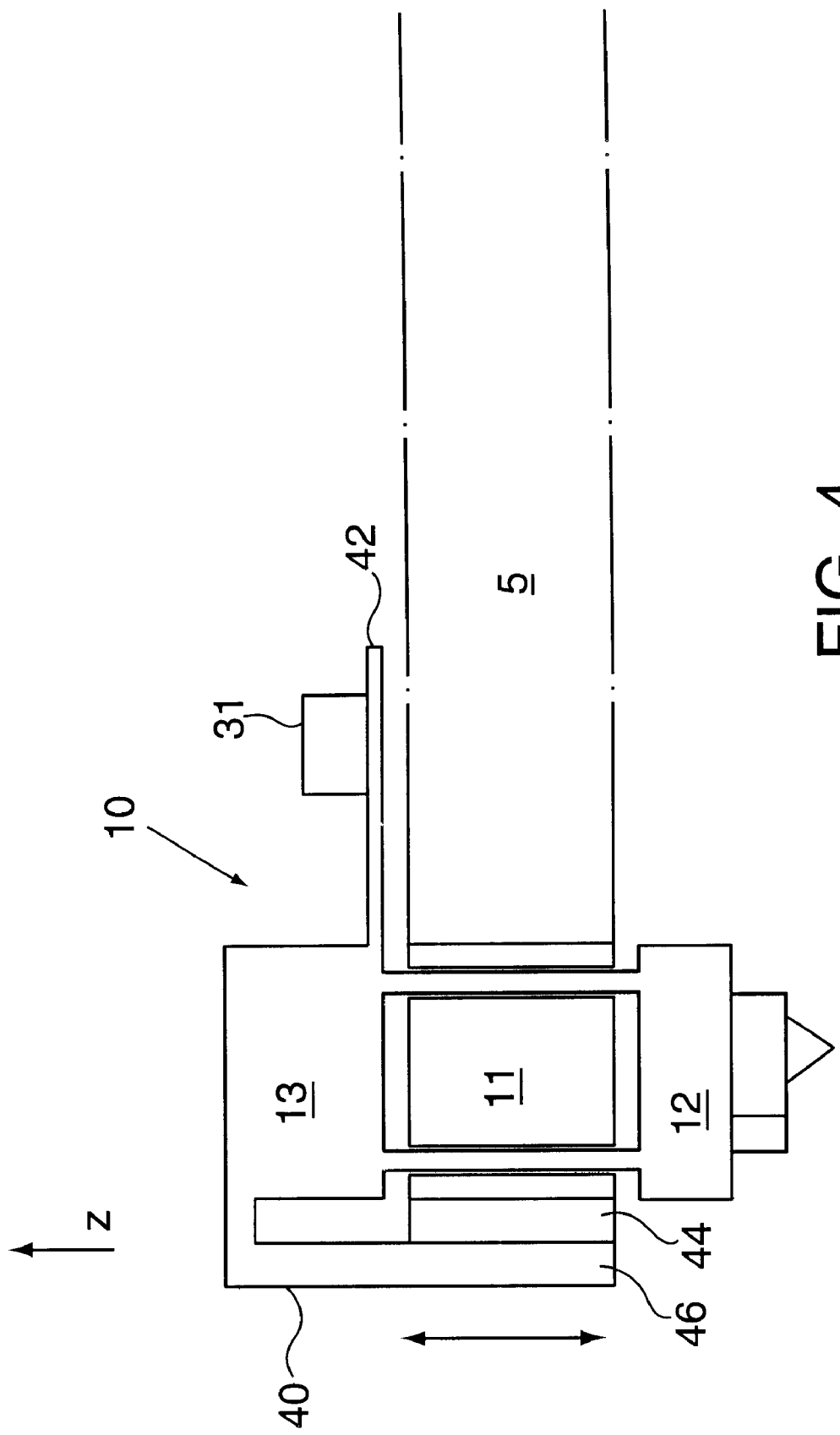
FIG. 4 is a schematic side elevation of a third embodiment of a set-up of a laser processing device according to the present invention.

FIG. 4 shows an alternative embodiment of a laser processing device according to the invention. Parts corresponding to those of FIGS. 1 and 2 are again provided with identical reference numerals. The device according to FIG. 4 has a frame 5 and a processing/observation head which corresponds completely to the one discussed in relation to FIGS. 1 and 2. The device may further be provided with a manipulator, for instance an XY-table, as discussed in relation to FIG. 2. In this example, it applies that the first head housing 11 is fixedly connected to the frame 5, as in the device according to FIGS. 2 and 3. Furthermore, the third head housing 13 comprises a support 42 on which the camera 31 is positioned. This means that during a movement of the second head housing 12 and the third head housing 13 relative to the first head housing 11 and the frame 5, the camera 31 will move along. The device further comprises an autofocusing system 40 which is known per se and which comprises a first part 44 fixedly connected to the first head housing 11. The autofocusing system further comprises a second part 46 connected to the first part 44 for movement, by means of a motor, in the Z-direction shown in FIG. 4. The autofocusing system 40 comprises a motor known per se for setting the position of the second part 46 in Z-direction relative to the first part 44. In turn, the second part 46 is fixedly connected to the third head housing 13. The first part 44 further comprises means, known per se, for determining the distance between the focus spot on the workpiece and the processing/observation head 10, in this case the first head housing 11 thereof. On the basis of this distance determined, the first part 44 moves the second part 46 in the Z-direction such that the laser spot and the image recorded by the camera 31 is sharp. Hence, the movement of the second part 46 relative to the first part 44 causes the second head housing 12 and the third head housing 13 to move relative to the first head housing 11, while the distance between the second head housing 12 and the third head housing 13 is maintained unchanged, so that the image of the workpiece and the focus spot remain sharp, entirely analogously with the situation as discussed in relation to FIGS. 1, 2 and 3. Because the camera 31 also moves in synchronization with the second head housing 12 and the third head housing 13, the second head housing 12 and the third head housing 13 can be moved relative to the first head housing 11 over considerable distances in the Z-direction. This enables the device to process an object having considerable height variations.

Figure 5:
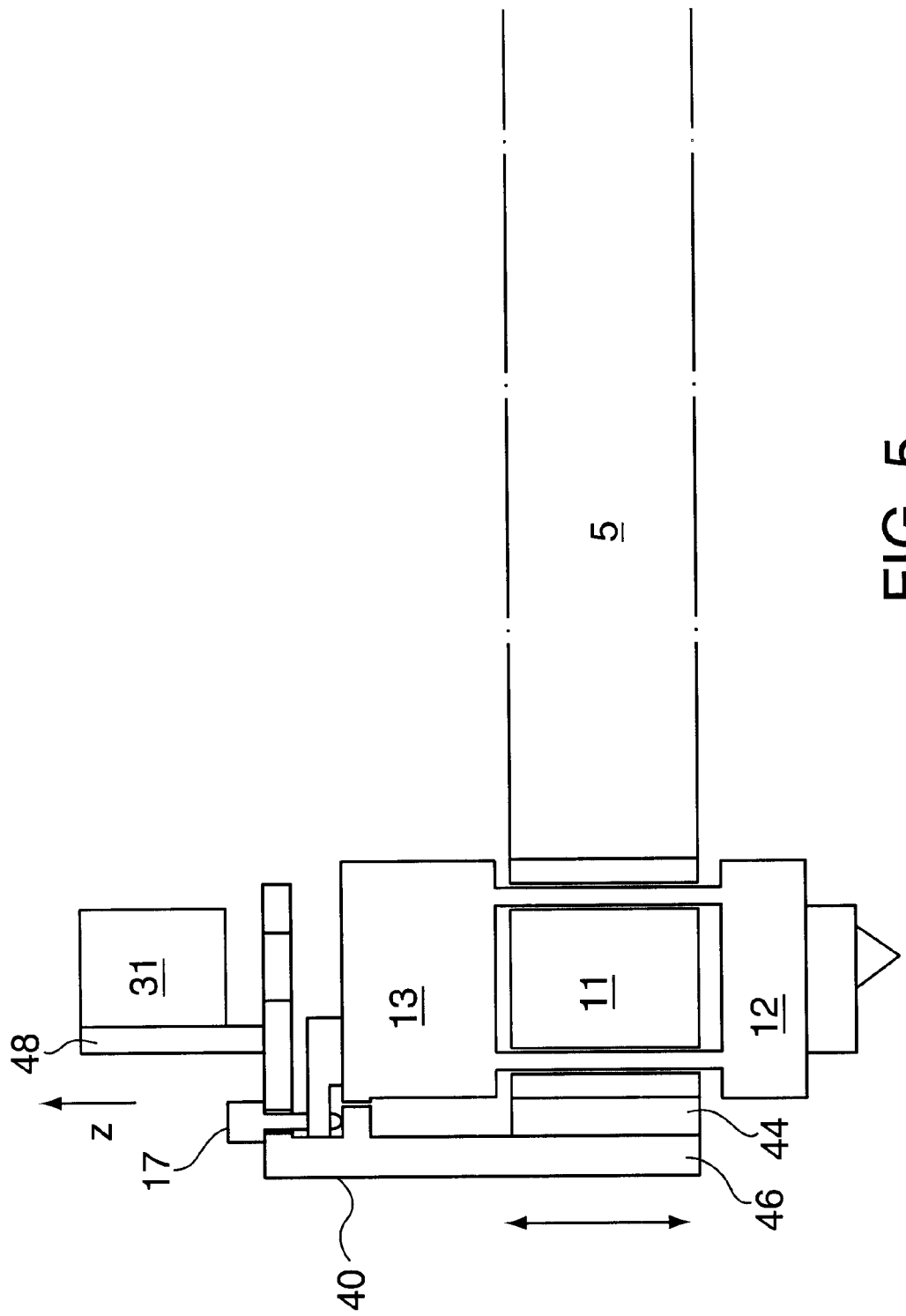
FIG. 5 is a schematic side elevation of a fourth embodiment of a set-up of a laser processing device according to the present invention.

FIG. 5 shows an alternative embodiment of a device comprising an autofocusing system. In FIG. 5, parts corresponding to the parts of FIGS. 1–3 are again provided with identical reference numerals. The device of FIG. 5 again comprises an autofocusing system having a first part 44 and a second part 46, interconnected for movement in the Z-direction. The first part 44 is again fixedly connected to the first head housing 11. The second part 46 is likewise fixedly connected to the third head housing 13 and, accordingly, to the second head housing 12. In this example, the camera 31 is connected to a support 48 which is fixedly connected to the second part 46 of the autofocusing system. The second mirror 24 in the processing/observation head 10 is left out. For that reason, the camera 31 is positioned above the imaging optics 23. By means of a micrometer 17, the distance between the camera 31 and the third head housing 13 can once be set, so that the camera 31 can once be positioned at the imaging point. Displacement of the laser focusing point through displacement of the laser focusing optics 22 again does not affect the focusing of the image of the workpiece, because during displacement of the laser focusing optics 22, the imaging optics 23 are displaced to an equal extent. The operation of the autofocusing system is further entirely analogous with the operation as described hereinabove. The first part 44 again determines the distance between the first head housing 11 or the processing/observation head 10 and the position of the focusing spot on the workpiece. On the basis of this distance, the first part 44 moves the second part 46 in the Z-direction such that the focus spot and the image are sharp. Hence, during movement of the second part 46 in the Z-direction, the second head housing 12, the third head housing 13 and the camera 31 are likewise moved to an equal extent in the Z-direction. To the device according to FIG. 5, too, it applies that the autofocusing system 40 concerns a system known per se, which will not be further explained here.

Both to the device according to FIG. 4 and to the device according to FIG. 5, it applies that instead of the first part 44, the second part 46 may also comprise means for determining the distance between the second head housing 12 and the workpiece. The autofocusing system 46 may be arranged such that this distance is kept constant, the distance being such that the focus spot and the image are sharp. This variant also falls within the framework of the invention.

It will be readily understood by anyone skilled in the art that the protective scope of the present invention as defined by the claims is not limited to the embodiments shown in the drawings and discussed, but that it is possible to change or modify the embodiments represented of the processing device according to the invention within the framework of the inventive concept. For instance, it is possible that for processing and for observing the workpiece, light of the same-wavelength is used; in that case, the laser mirror 21 will be partly transmissive.

It is also possible that the second mirror 24 is located before the imaging optics 23, with horizontal displacement of the imaging optics 23.

Further, it is possible that use is made of a laser source other than mentioned, and/or that the focus spot has dimensions other than mentioned.

Further, it is possible that the mutual distance between the second head housing 12 and the third head housing 13 is settable.

Further, the laser light 6 can be coupled in at a different angle, while the angle of the laser mirror 21 may be greater or smaller than 45°.

It is also possible that above the third head housing 13, a source for visible light is disposed for bringing additional light onto the workpiece 4. In that case, the second mirror 24 may be partly transmissive.

What is claimed is:

1. A laser processing device comprising:
    a frame having a hollow tube;
    a manipulator, such as an XY-table, mounted on said frame for manipulating a workpiece to be processed;
    a processing/observation head mounted on said frame above said manipulator, said processing/observation head comprising:
        a first head housing;
        a focusing means for focusing a light beam on a focus spot via a first optical path;
        an imaging means for forming a sharp image of a workpiece to be processed via a second optical path that at least partly coincides with said first optical path; and wherein:
            said imaging means comprises a laser focusing optics and an imaging optics, having optical axes that coincide with said second optical path;
            said focusing means comprises said laser focusing optics, and a laser mirror positioned between said laser focusing optics and said imaging optics, said laser mirror making an angle with said second optical path and at least partly reflecting laser light and at least partly transmitting visible light;
            said laser focusing optics is displaceable along said first optical path, and said imaging optics is displaceable along said second optical path, such that the mutual distance between said laser focusing optics and said imaging optics measured along said second optical path is constant; and
            said first head housing of said processing/observation head is attached to said hollow tube, and wherein a light beam is led through said hollow tube to said processing/observation head.

2. A processing/observation head for a laser processing device, said head comprising:
    an imaging means for forming a sharp image of a workpiece to be processed via a second optical path, said imaging means including a laser focusing optics and an imaging optics, having optical axes that coincide with said second optical path;
    a focusing means for focusing a light beam on a focus spot on said workpiece via a first optical path that at least partly coincides with said second optical path, said focusing means including said laser focusing optics and a laser mirror positioned between said laser focusing optics and said imaging optics, said laser mirror making an angle with said second optical path such that said laser mirror partly reflects laser light and partly transmits visible light; and
    means for mounting said laser focusing optics and said imaging optics for simultaneous displacement along said first optical path and said second optical path, respectively, such that the mutual distance between said laser focusing optics and said imaging optics measured along said second optical path remains constant.

3. A processing/observation head according to claim 2, wherein said focusing optics has a focal distance substantially equal to the focal distance of said imaging optics, and said mutual distance between said laser focusing optics and said imaging optics is at least substantially equal to the sum of said focal distances.

4. A processing/observation head according to claim 2, comprising:
    a first head housing having means for attaching said first head housing to a set-up frame, wherein said laser mirror mounts in said first head housing;
    a second head housing disposed under said first head housing, wherein said laser focusing optics mount in said second head housing; and
    a third head housing disposed above said first head housing, wherein said imaging optics mount in said third head housing, said second head housing couples to said third head housing, and the combination of said second head housing and said third head housing displaces as a unit relative to said first head housing.

5. A processing/observation head according to claim 4, wherein said second head housing and said third head housing are coupled by means of bars.

6. A processing/observation head according to claim 4, wherein between said second head housing and said set-up frame or said first head housing, a micrometer or the like is coupled for accurately setting the position of said combination of said second head housing and said third head housing relative to said first head housing.

7. A processing/observation head for a laser processing device, said head comprising:
    a focusing means for focusing a light beam on a focus spot via a first optical path;
    an imaging means for forming a sharp image of a workpiece to be processed via a second optical path that at least partly coincides with said first optical path, wherein said imaging means comprises a laser focusing optics and an imaging optics, having optical axes that coincide with said second optical path, and said focusing means comprises said laser focusing optics and a laser mirror positioned between said laser focusing optics and said imaging optics, said laser mirror making an angle with said second optical path, characterized in that said laser mirror at least partly reflects laser light and at least partly transmits visible light; and
    means mounting said laser focusing optics for displacement with respect to said laser mirror along said first optical path, and mounting said imaging optics for displacement, simultaneous with said displacement of said laser focusing optics, with respect to said laser mirror along said second optical path, such that the mutual distance between said laser focusing optics and said imaging optics, measured along said second optical path, is constant.

8. A processing/observation head according to claim 7, wherein said focusing optics has a focal distance substantially equal to the focal distance of said imaging optics, and said mutual distance between said laser focusing optics and said imaging optics is at least substantially equal to the sum of said focal distances.

9. A processing/observation head according to claim 7, comprising:
a first head housing having means for attaching said first head housing to a set-up frame, wherein said laser mirror mounts in said first head housing;
a second head housing disposed under said first head housing, wherein said laser focusing optics mount in said second head housing; and
a third head housing disposed above said first head housing, wherein said imaging optics mount in said third head housing, said second head housing couples to said third head housing, and the combination of said second head housing and said third head housing displaces as a unit relative to said first head housing.

10. A processing/observation head according to claim 9, wherein bars couple said second head housing to said third head housing.

11. A processing/observation head according to claim 9, wherein between said second head housing and said set-up frame or said first head housing, a micrometer or the like is coupled for accurately setting the position of said combination of said second head housing and said third head housing relative to said first head housing.

12. A laser processing device comprising:
a frame;
a manipulator such as an XY-table mounted on said frame for manipulating a workpiece to be processed; and
a processing/observation head for a laser processing device, said head comprising:
an imaging means for forming a sharp image of said workpiece to be processed via a second optical path, said imaging means including a laser focusing optics and an imaging optics, having optical axes that coincide with said second optical path;
a focusing means for focusing a light beam on a focus spot on said workpiece via a first optical path that at least partly coincides with said second optical path, said focusing means including said laser focusing optics and a laser mirror positioned between said laser focusing optics and said imaging optics, said laser mirror making an angle with said second optical path such that said laser mirror partly reflects laser light and partly transmits visible light; and
means for mounting said laser focusing optics and said imaging optics for simultaneous displacement along said first optical path and said second optical path, respectively, such that the mutual distance between said laser focusing optics and said imaging optics measured along said second optical path remains constant.

13. A laser processing device according to claim 12, wherein said manipulator includes means for setting the distance between said processing/observation head and said workpiece, and said laser processing device further comprises autofocusing means for determining a processing distance between said ptocessing/observation held and said workpiece at which the image is sharp and for controlling said manipulator to set said processing distance.

14. A laser processing device according to claim 13, wherein said manipulator comprises an XYZ-table, and a movement of said XYZ-table in a Z-direction of said XYZ-table sets said processing distance.

15. A laser processing device comprising:
a frame;
a manipulator such as an XY-table mounted on said frame for manipulating a workpiece to be processed; and
a processing/observation head for a laser processing device, said head comprising:
a focusing means for focusing a light beam on a focus spot via a first optical path;
an imaging means for forming a sharp image of said workpiece to be processed via a second optical path that at least partly coincides with said first optical path, wherein said imaging means comprises a laser focusing optics and an imaging optics, having optical axes that coincide with said second optical path, and said focusing means comprises said laser focusing optics and a laser mirror positioned between said laser focusing optics and said imaging optics, said laser mirror making an angle with said second optical path, characterized in that said laser mirror at least partly reflects laser light and at least partly transmits visible light; and
means mounting said laser focusing optics for displacement with respect to-said laser mirror along said first optical path, and mounting said imaging optics for, displacement, simultaneous with said displacement of said laser focusing optics, with respect to said laser mirror along said second optical path, such that the mutual distance between said laser focusing optics and said imaging optics, measured along said second optical path, is constant.

16. A laser processing device according to claim 15, wherein said manipulator includes means for setting the distance between said processing/observation head and said workpiece, and said laser processing device further comprises autofocusing means for determining a processing distance between said processing/observation head and said workpiece at which the image is sharp and for controlling said manipulator to set said processing distance.

17. A laser processing device according to claim 16, wherein said manipulator comprises an XYZ-table, and a movement of said XYZ-table in a Z-direction of said XYZ-table sets said processing distance.

18. A laser processing device comprising:
a processing/observation head comprising:
a focusing means for focusing a light beam on a focus spot via a first optical path;
an imaging means for forming a sharp image of a workpiece to be processed via a second optical path that at least partly coincides with said first optical path, wherein said imaging means comprises a laser focusing optics and an imaging optics, having optical axes that coincide with said second optical path, and said focusing means comprises said laser focusing optics and a laser mirror positioned between said laser focusing optics and said imaging optics, said laser mirror making an angle with said second optical path, characterized in that said laser mirror at least partly reflects laser light and at least partly transmits visible light; and
means mounting said laser focusing optics for displacement with respect to said laser mirror along said first optical path, and mounting said imaging optics for displacement, simultaneous with said displacement of said laser focusing optics, with respect to said laser mirror along said second optical path, such that the mutual distance between said laser focusing optics and said imaging optics, measured along said second optical path, is constant; and setting means for displacing in a direction along said optical axes, with a supply of control signals, said laser focusing optics, said imaging optiCs and a support on which, in use, a camera can be mounted and an autofocusing system arranged for generating said control signals, which, in use, are supplied to said setting means to form said sharp image.

* * * * *

UNITED STATES PATENT AND TRADEMARK OFFICE
CERTIFICATE OF CORRECTION

PATENT NO. : 6,437,287 B1 Page 1 of 1
APPLICATION NO. : 09/486912
DATED : August 20, 2002
INVENTOR(S) : Herman L. Offerhaus, Richard A. Kleijhorst and Peter J.M. Van Der Slot It is certified that error appears in the above-identified patent and that said Letters Patent is hereby corrected as shown below:

Please insert item (73)
Assignee:   Nederlands Centrum voor Laser Research B.V.

Signed and Sealed this

Twenty-ninth Day of August, 2006

JON W. DUDAS
*Director of the United States Patent and Trademark Office*